United States Patent
Itskovich

(10) Patent No.: US 9,857,499 B2
(45) Date of Patent: Jan. 2, 2018

(54) DOWNHOLE TRANSIENT RESISTIVITY MEASUREMENTS

(71) Applicant: Gregory Itskovich, Houston, TX (US)

(72) Inventor: Gregory Itskovich, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

(21) Appl. No.: 15/048,263

(22) Filed: Feb. 19, 2016

(65) Prior Publication Data

US 2017/0242146 A1    Aug. 24, 2017

(51) Int. Cl.
*G01V 3/28* (2006.01)
*E21B 49/00* (2006.01)

(52) U.S. Cl.
CPC .............. *G01V 3/28* (2013.01); *E21B 49/00* (2013.01)

(58) Field of Classification Search
CPC .............. G01V 3/00–3/40; E21B 49/00–49/10
USPC ........................................................ 324/339
See application file for complete search history.

(56) References Cited

U.S. PATENT DOCUMENTS

| | | | |
|---|---|---|---|
| 6,400,148 B1 * | 6/2002 | Meyer | G01V 3/30 324/300 |
| 6,906,521 B2 | 6/2005 | Tabarovsky | |
| 7,026,820 B2 | 4/2006 | Xiao et al. | |
| 7,027,922 B2 | 4/2006 | Bespalov et al. | |
| 7,046,009 B2 | 5/2006 | Itskovich | |
| 7,150,316 B2 | 12/2006 | Itskovich | |
| 7,167,006 B2 | 1/2007 | Itskovich | |
| 7,538,555 B2 | 5/2009 | Banning et al. | |
| 7,583,085 B2 | 9/2009 | Hall et al. | |
| 7,612,565 B2 | 11/2009 | Seydoux et al. | |
| 8,035,392 B2 * | 10/2011 | Itskovich | G01V 3/28 324/332 |

(Continued)

FOREIGN PATENT DOCUMENTS

WO    01155748 A1    8/2001

OTHER PUBLICATIONS

Geosteering Resistivity Tool; CBG Corp; retrieved from Internet; URL: http://www.cbgcorp.com/catalog/restools/; 2015; 5 pgs.

(Continued)

*Primary Examiner* — Melissa Koval
*Assistant Examiner* — Rahul Maini
(74) *Attorney, Agent, or Firm* — Cantor Colburn LLP

(57) ABSTRACT

A method of performing an electromagnetic measurement of an earth formation includes disposing a downhole tool in a borehole in an earth formation, the downhole tool including an electrically conductive component, at least one electromagnetic transmitter located at a location along the tool, a first receiver located a first distance from the location, and a second receiver located at a second distance from the location. The method also includes applying a single rectangular current pulse having a substantially constant amplitude to the transmitter to generate an electric current in the formation, the current pulse having a specified time duration $\Delta T$. The method further includes measuring transient signals during a time period subsequent to the time in response to the generated current, combining the transient signals to generate a combined transient signal, and estimating a resistivity of the formation based on the combined transient signal.

20 Claims, 7 Drawing Sheets

(56) References Cited

U.S. PATENT DOCUMENTS

| | | | |
|---|---|---|---|
| 8,356,673 B2 | 1/2013 | Bass et al. | |
| 9,057,799 B2 | 6/2015 | Allen | |
| 9,075,164 B2* | 7/2015 | Reiderman | G01V 3/38 |
| 2007/0216416 A1 | 9/2007 | Itskovich | |
| 2010/0097065 A1 | 4/2010 | Itskovich et al. | |
| 2010/0191469 A1 | 7/2010 | Mogilatov | |
| 2013/0191028 A1 | 7/2013 | Homan et al. | |
| 2015/0219741 A1* | 8/2015 | San Martin | G01V 3/20 |
| | | | 324/354 |
| 2016/0047934 A1* | 2/2016 | Wang | G01V 3/28 |
| | | | 702/7 |

OTHER PUBLICATIONS

Sperry Drilling MWD/LWD Services; Halliburton; 2010; retrieved from Internet; URL: http://www.baroididp.com/premium/ss/contents/brochures/web/h07333_mwd-lwd_services_overview.pdf; 8 pgs.

* cited by examiner

DOWNHOLE TRANSIENT RESISTIVITY MEASUREMENTS

BACKGROUND

Various techniques are used to measure formation properties, such as transient electromagnetic (EM) induction measurement techniques. Transient EM methods such as deep transient logging while drilling (LWD) and measurement while drilling (MWD), especially using "look-ahead" capability, have been shown to have great use in geologic formation evaluation and measurement. Transient EM techniques involve disposing a tool including at least one transmitter and receiver, and transmitting transient pulses of current into a formation. The induced electromagnetic field and decay responses are measured. Transient EM measurements can be used for various purposes, such as estimation of the electrical conductivity of earth formations surrounding a borehole. Transient EM measurements may also be used for geo-steering, e.g., by identifying formation boundaries.

There are several factors that pose challenges to performing both geo-steering and ahead of the bit induction measurements while drilling. One factor is the electrically conductive drill string (e.g., metal pipe). The measured transient induction signal is severally affected by eddy currents that develop in the drill string and limit resolution of measurements of formation parameters, for example, measurements of a water-oil boundary in the case of geo-steering.

SUMMARY

An embodiment of a method of performing an electromagnetic measurement of an earth formation includes disposing a downhole tool in a borehole in an earth formation, the downhole tool including an electrically conductive component, at least one electromagnetic transmitter located at a location along the tool, a first receiver located a first distance from the location, and a second receiver located at a second distance from the location. The method also includes applying a single rectangular current pulse having a substantially constant amplitude to the transmitter to generate an electric current in the formation, the current pulse having a specified time duration $\Delta T$. The method further includes measuring transient signals at each of the first and second receivers during a time period subsequent to the time in response to the generated current, combining the transient signals to generate a combined transient signal, and estimating a resistivity of the formation based on the combined transient signal, where estimating is performed as a part of a downhole operation.

An embodiment of a system for performing an electromagnetic measurement of an earth formation includes a downhole tool configured to be disposed in a borehole in an earth formation, the downhole tool including an electrically conductive component, at least one electromagnetic transmitter located at a location along the tool, a first receiver located a first distance from the location, and a second receiver located at a second distance from the location. The system also includes a processing device configured to apply a single rectangular current pulse having a substantially constant amplitude to the transmitter to generate an electric current in the formation, the current pulse having a specified time duration $\Delta T$. The processing device is configured to perform measuring transient signals at each of the first and second receivers during a time period subsequent to the time in response to the generated current, combining the transient signals to generate a combined transient signal, and estimating a resistivity of the formation based on the combined transient signal, wherein estimating is performed as a part of a downhole operation.

BRIEF DESCRIPTION OF THE DRAWINGS

The following descriptions should not be considered limiting in any way. With reference to the accompanying drawings, like elements are numbered alike.

DETAILED DESCRIPTION

Apparatuses and methods are provided for performing transient electromagnetic (EM) measurement operations, such as logging-while-drilling (LWD) or measurement-while-drilling (MWD) operations. An embodiment of a device and method is provided for performing resistivity measurements suitable for both geo-steering and measurements ahead of a drill bit. The device and method may be employed to extract information about the resistivity of a formation in the presence of electrically conductive downhole components (e.g., a drill string, drill bit and/or bottom-hole assembly). The method includes performing transient electromagnetic measurements by generating EM pulses by a transmitter and measuring a transient signal at receivers placed at selected distances from the transmitter.

To reduce the parasitic effect of currents in conductive downhole components, the systems and methods described herein are based on the time derivative of the electromotive force measured in the receivers due to a transient signal. In one embodiment, a method includes exciting the transmitter according to a step function, and calculating the time derivative of the electromotive force measured in at least two receivers. Formation properties are estimated in this embodiment based on the time derivative.

In another embodiment, the method includes exciting the transmitter with a single rectangular pulse, and measuring the electromotive force due to the transient response of the formation in at least two receivers at a time subsequent to the end of the pulse. The rectangular pulse is selected to follow (as much as possible) a function that is the time derivative of a step function. Formation properties can be estimated in this embodiment based on the measured signal without numerically calculating the time derivative.

Figure 1:
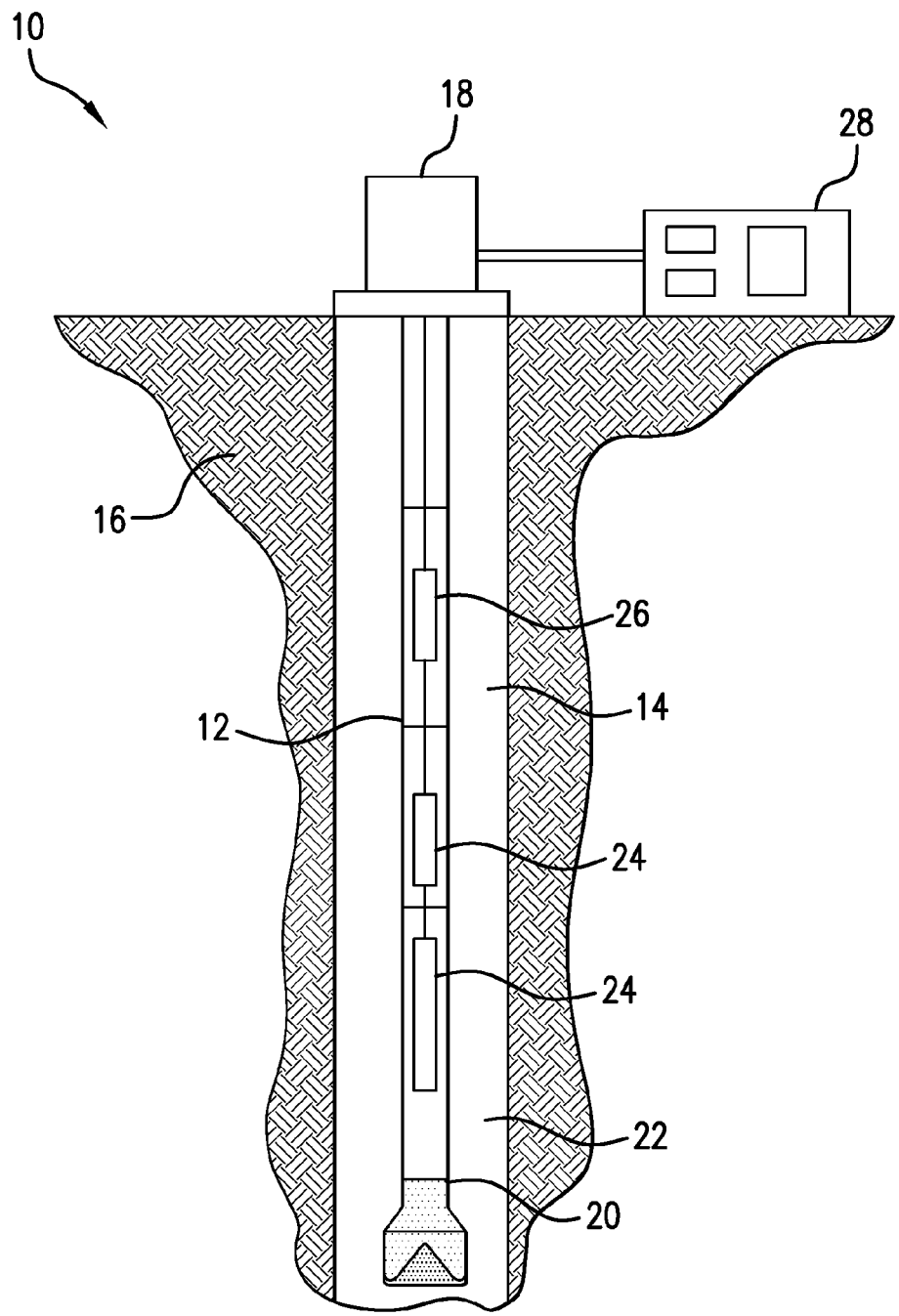
FIG. 1 depicts an exemplary embodiment of a drilling, formation evaluation and/or production system.

Referring to FIG. 1, an exemplary embodiment of a well drilling, logging and/or production system 10 includes a borehole string 12 that is shown disposed in a wellbore or borehole 14 that penetrates at least one earth formation 16 during a drilling or other downhole operation. A surface structure 18 includes various components such as a wellhead, derrick and/or rotary table or supporting the borehole string, lowering string sections or other downhole components. In one embodiment, the borehole string 12 is a drillstring including one or more drill pipe sections that extend downward into the borehole 14, and is connected to a drilling assembly 20. In one embodiment, system 10 includes any number of downhole tools 24 for various processes including formation drilling, geosteering, and formation evaluation (FE) for measuring versus depth and/or time one or more physical quantities in or around a borehole. The tool 24 may be included in or embodied as a bottomhole assembly (BHA) 22, drillstring component or other suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carrier examples include casing pipes, wirelines, wireline sondes, slickline sondes, drop shots, downhole subs, bottom-hole assemblies, and drill strings.

The tool 24, the BHA 22 or other portions of the borehole string 12 include sensor devices configured to measure various parameters of the formation and/or borehole. In one embodiment, the sensor devices include one or more transmitters and receivers configured to transmit and receive electromagnetic signals for measurement of formation properties such as composition, resistivity and permeability. An exemplary measurement technique is a transient EM technique.

In one embodiment, the tool 24, BHA 22 and/or sensor devices include and/or are configured to communicate with a processor or processing device to receive, measure and/or estimate directional and other characteristics of the downhole components, borehole and/or the formation. For example, the tool 24 is equipped with transmission equipment to communicate with a processing device such as a downhole processor 26 or a surface processing unit 28. Such transmission equipment may take any desired form, and different transmission media and connections may be used. Examples of connections include wired, fiber optic, acoustic, wireless connections and mud pulse telemetry.

The processor may be configured to receive data from the tool 24 and/or process the data to generate formation parameter information. In one embodiment, a processor such as the surface processing unit 28 is configured as a control unit which controls parameters of a downhole operation, referred to as operational parameters. Examples of operational parameters include as rotary speed, weight-on-bit, drilling fluid flow parameters, steering parameters (e.g., inclination) and others.

In one embodiment, the processor (e.g., the surface processing unit 28) is configured to control transient resistivity measurements described herein, estimate formation properties based on the measurements, and control operational parameters based on the estimated formation properties. The processor may itself control acquisition of transient resistivity measurement and/or estimation of formation properties, or may receive measurements and/or properties from another processor and control operational parameters based on the received measurements and/or properties. For example, the processor estimates or receives estimations of formation properties such as a lithology boundary or oil-water boundary, and steers a drilling assembly based on the location of the boundary.

Figure 2:
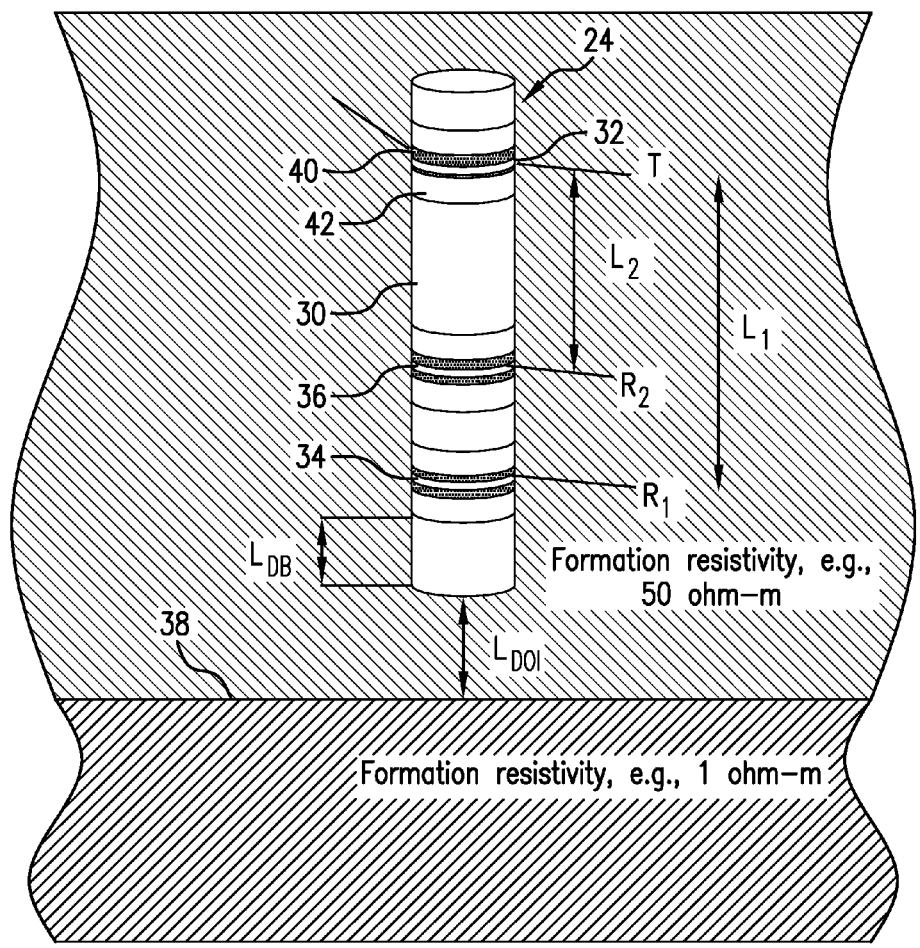
FIG. 2 depicts an exemplary embodiment of a downhole tool.

FIG. 2 illustrates an embodiment of the downhole tool 24. The downhole tool 24 is disposed in a carrier configured to be disposed downhole. The carrier is incorporated as or in a downhole component such as a drill pipe segment 30. The tool 24 includes a resistivity measurement assembly incorporating at least one electromagnetic (EM) source and multiple EM receivers. An EM transmitter 32 such as a transmitter antenna or coil is configured to emit an electromagnetic field into the surrounding formation and induce a magnetic field response that is measured by one or more EM receivers. For example, the receivers include a first receiver coil 34 (also referred to as a "main coil") and a second receiver coil 36 (also referred to as a "bucking coil"). An electric source, which may be disposed downhole or at a surface location, is configured to apply electric current to the transmitter 32.

In one embodiment, the measurement assembly is configured to perform an inductive transient EM measurement operation. The source applies transient pulses of current to the transmitter 32, which induces current in the formation. The current generates a magnetic field that is detected as a transient signal by the receivers 34 and 36.

In one embodiment, the transmitter and the receivers are disposed axially relative to one another. An "axial" location refers to a location along the longitudinal axis of the tool, borehole string and/or borehole. In the example of FIG. 2, the first receiver coil 34 is positioned at a selected axial distance $L_1$ from the transmitter 32, and the second receiver coil 36 is positioned at a shorter axial distance $L_2$ from the transmitter. The measurement assembly is positioned in the tool at a selected distance $L_{DB}$ from the drill bit (not shown).

The tool 24 utilizes electromagnetic measurements to determine the electrical conductivity of formations surrounding the borehole. Various types of tools may be employed to measure formations at various "depths of investigations" or DOI, which correspond to distances from the tool and/or borehole. Typically, voltage or current pulses that are excited in a transmitter initiate the propagation of an electromagnetic signal in the earth formation. Electric currents diffuse outwards from the transmitter into the surrounding formation. At different times, information arrives at receivers from different investigation depths. As transient signals from formation regions at different distances are detected at different times, the distance or DOI (such as the distance to a formation boundary 38) can be selected by selecting a corresponding time window (after a pulse is generated by the transmitter) at which transient signals are measured. Transient EM methods are useful for deep investigations where the DOI is up to tens of meters from the borehole, and for ultra-deep investigations where the DOI is tens to hundreds of meters from the borehole.

In a traditional transient induction method, current in the transmitter coil is turned on from zero to a selected value at an initial time (t=0), and after that the transient signal is measured in receiving coils. The current is traditionally applied according to a step function. The measurements are taken while rotating tool is moving along the borehole trajectory. In response to the magnetic field generated by the transmitter coil, current is induced both in drill pipe and in the formation. The formation currents (eddy currents) begin diffusing from the region close to the transmitter coil in all the directions surrounding the transmitter.

Contribution due to eddy currents in the pipe is considered parasitic because, at the time interval when parameters of the interest manifest themselves, the signal due to currents in the pipe is stronger than the signal from the formation. In one approach, in order to measure a signal that is substantially unaffected by the eddy currents in the pipe, transient signals are measured at a very late stage in time when signals from the formation dominate compared to signals from the pipe. The weakness of this approach is that the signal from the formation at such a late stage is very small and cannot be reliably measured.

Another approach is to increase the distance between the transmitter and the receivers, which has the effect of reducing the influence of the pipe and shifting the dominant contribution of the formation to an earlier time range. A weakness to this approach, in addition to limited resolution with respect to resistivity boundaries, is that the resulting system is very long (e.g., up to 10-15 meters (m)) which can be impractical, especially for a MWD tool.

Embodiments of systems, devices and methods described herein address such weaknesses and allow for the use of a relatively short MWD tool that is capable of effectively seeing ahead-placed geophysical targets. The tool 24 (or other suitable device and/or system) is configured to excite a transmitter according to a selected function, and measure transient electromagnetic signals when current is switched off in the transmitter. To reduce a parasitic effect of the currents in a drill pipe and/or other conductive components, the method in one embodiment includes measuring or calculating the time derivative of the electromotive force in at least two receivers (e.g., a main coil and a bucking coil).

In one embodiment, the transmitter is excited with a pulse having a rectangular function having a substantially constant amplitude and a selected duration. The electromotive force is measured in each receiving coil. The rectangular pulse may be a single pulse having an amplitude and a short duration that may be selected based on the desired DOI. In one embodiment, the rectangular pulse is shaped as close as practically possible to a function representing the time derivative of a step function traditionally used to excite the transmitter.

Transient measurements may be performed in two operational modes: the first mode (the bucking mode) is used to perform measurements and find a bucking coefficient, and the second mode (operation mode) is executed downhole to provide information about the resistivity of the formation. "Bucking" is defined as a combination of two receiving signals, ensuring a zero signal, when measurements are taken in the absence of the formation (e.g., in the air).

Embodiments described herein are based on an analysis of the transient response of receiving coils in an EM transient measurement device or system. This analysis demonstrates the effectiveness of using the time derivative of measurement responses to inform the processing of measurements and/or the configuration of transmitter excitation. The transient response S(t) can presented in the following approximated form:

$$S(t)=S_P(t)+S_F(t), \quad (1)$$

where signal $S_P(t)$ corresponds to the contribution of a drill pipe segment (and/or other conductive component) to a transient signal, and $S_F(t)$ corresponds to the contribution of the formation. For analysis, an asymptotic expression can be used for each term in equation (1). Then, in the case of a traditional step-function excitation, the signal from the pipe can be expressed as:

$$S_P(t) \approx \frac{A}{t^{1/2}}, \quad (2)$$

and the signal from the formation can be expressed as:

$$S_F(t) \approx \frac{B}{t^{5/2}}. \quad (3)$$

In the above equations (2) and (3), A and B are constants.

The parameter that defines a relative contribution of the formation into a measured transient signal is a ratio R of the formation contribution to the pipe contribution. The ratio ($R_S$) calculated for the measured signal is:

$$R_S(t) = \frac{S_F(t)}{S_P(t)} = \frac{B}{t^{5/2}} \frac{t^{1/2}}{A} = \frac{B}{A} \frac{1}{t^2}. \quad (4)$$

As can be seen from equation (4), the ratio $R_S(t)$ is quadratically reduced with time.

Calculating the time derivative of the signal S(t) yields:

$$S'(t) = -\frac{1}{2}At^{-3.5} - \frac{5}{2}Bt^{-3.5}. \quad (5)$$

The ratio ($R_D$) can be expressed as:

$$R_D(t) = \frac{S'_F(t)}{S'_P(t)} = \frac{5}{2}\frac{B}{t^{7/2}}\frac{2}{1}\frac{t^{3/2}}{A} = 5\frac{B}{A}\frac{1}{t^2}. \quad (6)$$

Comparing (6) and (4) shows that the relative contribution to the signal from the formation is larger by a factor of five when the first derivative of the signal is measured instead of the signal itself. In addition, measuring the second derivative and/or following derivatives (e.g., third derivative, fourth derivative, etc.) can be performed to further improve the $R_D$ ratio.

Embodiments described herein can be used in combination with various devices, components or other means to further suppress the parasitic effect. For example, short magneto-static and electro-magnetic shields are incorporated into a measurement tool or device.

FIG. 2 illustrates an example of shields incorporated into the tool 24 to help to suppress parasitic currents. A magnetic material such as a magneto-static shield 40 is disposed between the transmitter coil 32 and the drill pipe segment 30 material and is axially centered around the transmitter coil. The shield 40 may also be similarly disposed with respect to each receiver coil.

In this example, a conductive electromagnetic shield 42 is disposed proximate to the transmitter coil 32 and axially centered around the transmitter coil. The shield 42 may also be similarly disposed with respect to each receiver coil.

The shields provide a number of benefits, including substantially reducing the eddy currents in the portion of the pipe segment 30 covered by the magnetic material. In addition, the contribution to a measured signal of the eddy currents induced in the copper shield is substantially reduced relative to the contribution of the eddy currents induced in the formation, which preserves resolution of transient signals to remote resistivity boundaries. The shields also act to substantially improve the quality of bucking, and significantly boost the effective transmitter/receiver moment thanks to the magnetic material used for shielding.

Although embodiments are described in conjunction with an induction measurement device (e.g., logging tool), they are not so limited. Embodiments described herein may be used in conjunction with any suitable electromagnetic measurement device or system that experiences parasitic currents or signals. An example of a suitable device or system is an electrode resistivity device (e.g., a laterolog tool).

Figure 3:
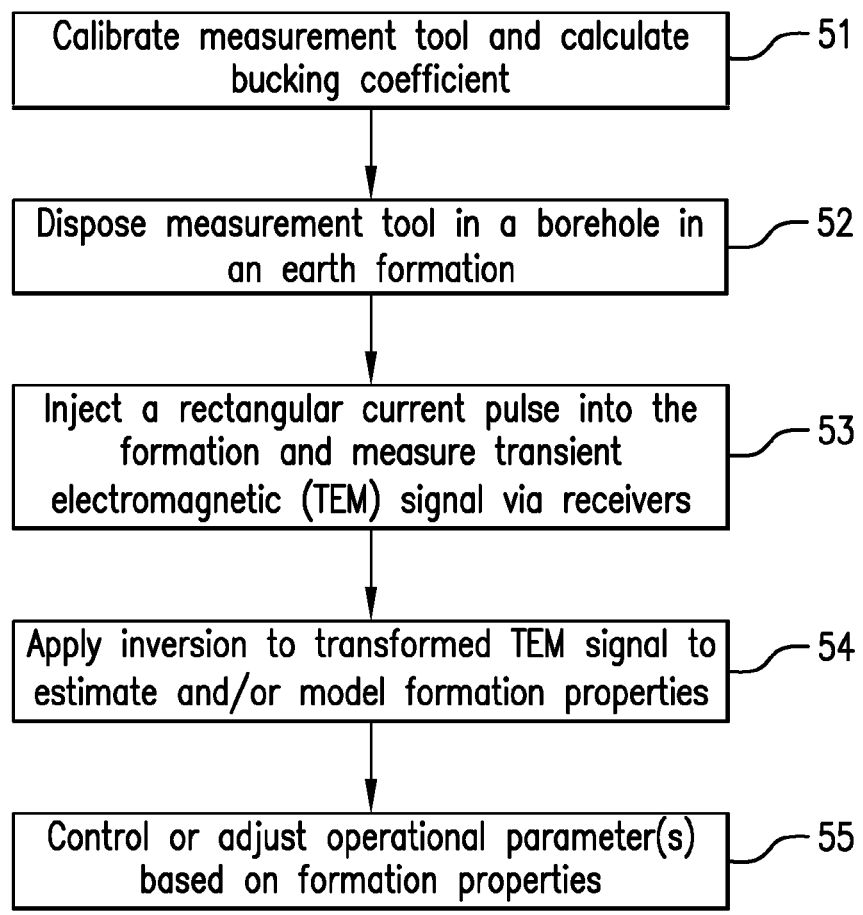
FIG. 3 is a flow chart providing an exemplary method of processing electromagnetic signal data and/or measuring formation properties.

FIG. 3 illustrates a method 50 for processing electromagnetic signal measurements and/or measuring parameters of an earth formation using electromagnetic signal measurements. The method 50 includes one or more of stages 51-55 described herein. The method may be performed continuously, periodically or intermittently as desired. For example, in a drilling and/or geosteering operation, the method 50 is performed periodically as a drill string and drill bit are rotated and advanced through a formation. The method is described herein in conjunction with the tool 24, although the method may be performed in conjunction with any number and configuration of processors, sensors and tools. The method may be performed by one or more processors or other devices capable of receiving and processing measurement data. In one embodiment, the method includes the execution of all of stages 51-55 in the order described. However, certain stages 51-55 may be omitted, stages may be added, or the order of the stages changed.

The method 50, in one embodiment, is performed in conjunction with a measurement device such as a MWD tool. The measurement device includes a transmitter T and two receivers $R_1$ and $R_2$. The transmitter and receivers are disposed at or near one or more conductive components, such as a drill pipe segment. An example of the measurement device is the tool 24 of FIG. 2. The method is not limited to use with the MWD tool, but can be used with any device or system capable of performing transient EM measurements.

In the first stage 51, the measurement device (e.g., the MWD tool) is calibrated by performing pulse induction measurements in air (or in another controlled or known environment) using a rectangular current pulse in the presence of the conductive pipe segment and the two receivers $R_1$ and $R_2$. The rectangular current pulse is selected based on an expected or desired DOI, and in one embodiment is the same as the pulse used in later stages of the method 50. In one embodiment, the pulse is as short as possible while being resolvable by the transmitter T. For example, the duration of each pulse is less than 20 microseconds (μsec). Two signals $C_1(t)$ and $C_2(t)$ are measured by the receivers $R_1$ and $R_2$, respectively. A time-dependent bucking coefficient $K(t)$ is calculated by calculating a ratio $C_2(t)/C_1(t)$. This stage may be considered to constitute a bucking mode.

In the second stage 52, the tool 24 is lowered or disposed in the borehole. The tool 24 may be lowered, for example, during a downhole operation such as a drilling operation, a geo-steering operation, a MWD operation and/or a LWD operation.

In the third stage 53, a current is applied to the transmitter T at an initial time $t_0$. In one embodiment, the current is applied as a discrete pulse that is configured based on the time derivative of a transient signal measured in response to step function excitation. In one embodiment, the current pulse is a rectangular pulse having a discrete duration that is selected based on a desired DOI. Subsequent to the end of the pulse, the electromotive force is measured at both the receiver $R_1$ and the receiver $R_2$ to estimate the transient signal generated in a formation region at or around the DOI. Thus, two signals $S_1(t)$ and $S_2(t)$ are acquired from receiver $R_1$ and $R_2$, respectively. The duration of the pulse is, in one embodiment, less than 20 μsec.

In one embodiment, differentiation (i.e., finding the derivative) of the transient signal is performed on the transmitter side (a hardware implementation), instead of the receiver. The time derivative of a step function is a delta-function, which represents a rectangular pulse with zero duration and infinite amplitude. Of course, this function is not physically realizable and thus an approximation is used. A rectangular pulse is selected in place of the delta-function, which has a finite duration $\Delta T$ and finite amplitude (e.g., $1/\Delta T$). Unlike in traditional transient measurements, the current in the transmitter coil is turned on from zero to an amplitude value $I_0$ at the moment $t=t_0$ and then the current is turned off at $t=\Delta T$ and vanishes to zero.

The duration $\Delta T$ is selected based on a number of considerations. One consideration is that the duration of the pulse should be short enough to approximate the differentiation. Another consideration is the limitations of the transmitter. For example, very fast power switch of an induction coil is problematic. Thus, the duration $\Delta T$, in one embodiment, is selected to be as short as possible, while having a minimum duration to avoid problems that occur if the current is switched on and off within a time interval that is less than the minimum duration. This minimum duration can be determined based on characteristics of the induction loop and accompanying circuitry.

Figure 4:
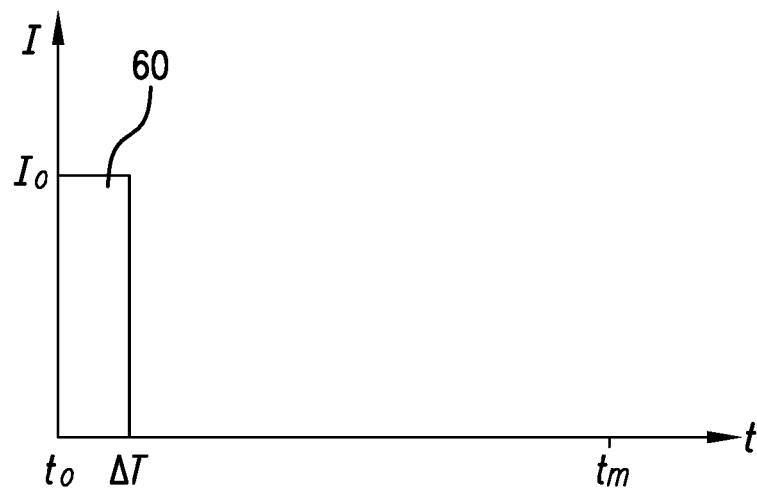
FIG. 4 depicts an example of a discrete current pulse for excitation of a transmitter as part of a transient electromagnetic measurement.

In one embodiment, the duration $\Delta T$ is selected based on the largest DOI that is to be targeted. This can be determined by estimating the time interval between the initial time $t_0$ and a time (referred to as measurement time or arrival time and denoted $t_m$) at which the transient signal from the formation regions at the largest DOI is detected at the receivers. As discussed above and shown by equation (4), the pipe parasitic effect is the most pronounced at late times, thus the duration is selected to correspond with earlier times at which the formation dominates the transient signal. Thus, the duration is selected to be at least multiple times smaller than the time interval $t_m-t_0$. An example of the pulse is shown in FIG. 4, which illustrates an excitation pulse 60 as a function of time t.

For example, in geo-steering and navigation operations, the targeted DOI is typically up to tens of meters, which suggests a time interval about 1 to 200 μsec. The duration $\Delta T$ is selected to be less than or equal to ⅕ of the time interval $t_m-t_0$. For example, the duration is selected to satisfy the requirement that $\Delta T/(t_m-t_0)$ is less than or equal to 0.1 to 0.2 which indicates that the duration of the pulse should be several times smaller compared to the moment of time when signal from the farthest located formation region of interest is measured.

For example, if the signal is measured up to 100 μsec, the duration of the pulse will be below 10 to 20 μsec. This will ensure favorable conditions for measuring effect from formation, minimally affected by the pipe and still implementable. It is noted that the above examples are not intended to be limiting, as the duration may be selected to be any suitable fraction of the time interval during which the formation contribution is at least significantly higher than the pipe contribution.

The signals $S_1(t)$ and $S_2(t)$ are combined to calculate a combined signal that can be used to estimate formation properties, e.g., resistivity. In one embodiment, the signals $S_1(t)$ and $S_2(t)$ are combined using the bucking coefficient to generate a differential (bucked) signal $\Delta S(t)$ according to the following equation:

$$\Delta S(t) = S_2(t) - K(t) * S_1(t).$$

In the fourth stage 54, algorithms of inversion and/or modeling are applied the combined signal for the purpose of, e.g., formation evaluation and geosteering. The combined signal is inverted to provide estimations of formation properties, such as resistivities and distances to interfaces or boundaries (e.g., a water-oil contact boundary) in the formation. Any suitable inversion can be employed to estimate or model formation properties. In one embodiment, an inversion of the combined signal is based on a modeled response of the receivers. The modeled response may be calculated based on a model of the measured device (e.g., MWD tool) that excludes the drill pipe and/or other conductive components.

In the fifth stage 55, various actions may be performed by the processing device and/or a human operator. In one embodiment, one or more operational parameters are controlled or adjusted based on the estimated formation properties. For example, drilling parameters such as weight on bit, rotational rate and/or fluid parameters are controlled or adjusted based on properties of the formation layer that the drill bit is in or is approaching. In another example, the drill bit is steered in response to detection of a formation boundary in order to direct the drill bit to a desired formation layer or region, or to maintain the drill bit within a desired layer or region. The control or adjustment of operational parameters may be performed by the processing device, or the processing device can display information to allow a user to perform the control or adjustment.

Another embodiment of the method 50 involves using a step function to excite the transmitter. Transient signals are detected by each receiver, and the time derivative of each signal is calculated. These time derivatives are combined, e.g., with the bucking coefficient, and the combined signal is then used to estimate formation properties.

In one embodiment, a time interval is selected based on distances between the measurement device and a region of interest. The time interval is bounded by a first time $t_1$ corresponding to the closest DOI and a second time $t_2$ corresponding to the farthest DOI. The time derivative of each signal (i.e., $S_1(t)$ and $S_2(t)$) is estimated numerically for the interval $(t_2 - t_1)$. Then differentiation can be performed according to the following equation:

$$S'(t) = (S(t_2) - S(t_1))/(t_2 - t_1). \quad (8)$$

The time interval used for differentiation may be equal to the duration $\Delta T$ discussed above. For example, following the estimate discussed above for a DOI of up to tens of meters, the time interval over which differentiation is calculated is 10 and 20 µsec.

In one embodiment, as an alternative to selecting a discrete range for differentiation, a least square fit of the signal is performed using, for example, spline basis functions. The time derivative of the signal is then calculated over the entire time range where the transient signal is measured.

FIGS. 5-10 show examples of performance of the method 50, and illustrate benefits of the embodiments described herein. In these examples, resistivity measurements were performed for numerically modeled formations having different resistivities. The measurement tool in these examples was similar to the tool 24 shown in FIG. 2, and included a longitudinally-oriented transmitting coil with the moment Mz parallel to a steel drill pipe, and two receiving coils (a main coil and a bucking coil) also oriented in the longitudinal direction. The tool also included magneto-static shields made from ferrite, and electromagnetic shields made from copper. Current was induced in the formation and in the drill pipe according to the method 50, and the resulting electromotive force was measured by the receiving coils.

Figure 5:
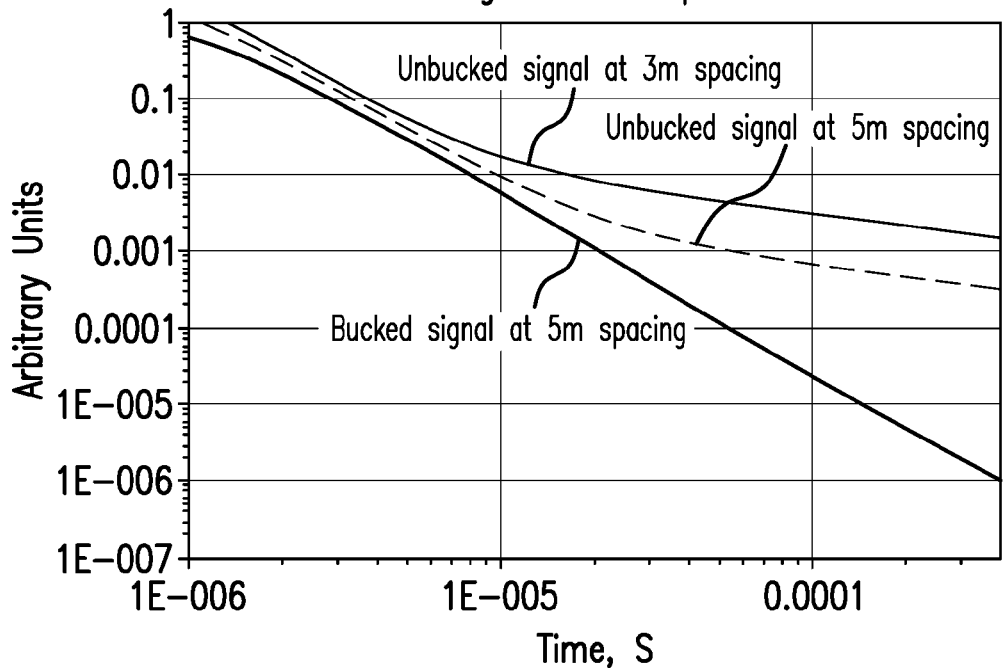
FIG. 5 shows unbucked and bucked signals generated by a simulated measurement using step function excitation of a transmitter.

The parameters of the synthetic tool and the steel drill pipe were as follows:
Distance between transmitter and main coil: 5 m
Distance between transmitter and bucking coil: 3 m
Drill Pipe radius: 7 cm
Drill pipe thickness: 3 cm
Resistivity of drill pipe: 0.714 E-06 ohm-meter (ohmm)
Resistivity of copper shield: 1.7 E-08 ohmm
Copper shield length: 0.75 m
Permeability of ferrite shield: 100
Ferrite shield length: 0.10 m
Ferrite shield thickness: 1.5 cm
Transmitter/Receiver coil radius: 8.5 cm In a first example, measurements were performed in a homogeneous formation having a resistivity of 10 ohmm. FIG. 5 shows the original (unbucked) transient signals measured by each receiver coil, and also shows a combined (bucked) signal calculated as discussed above. These signals correspond to traditional step function excitation.

Figure 6:
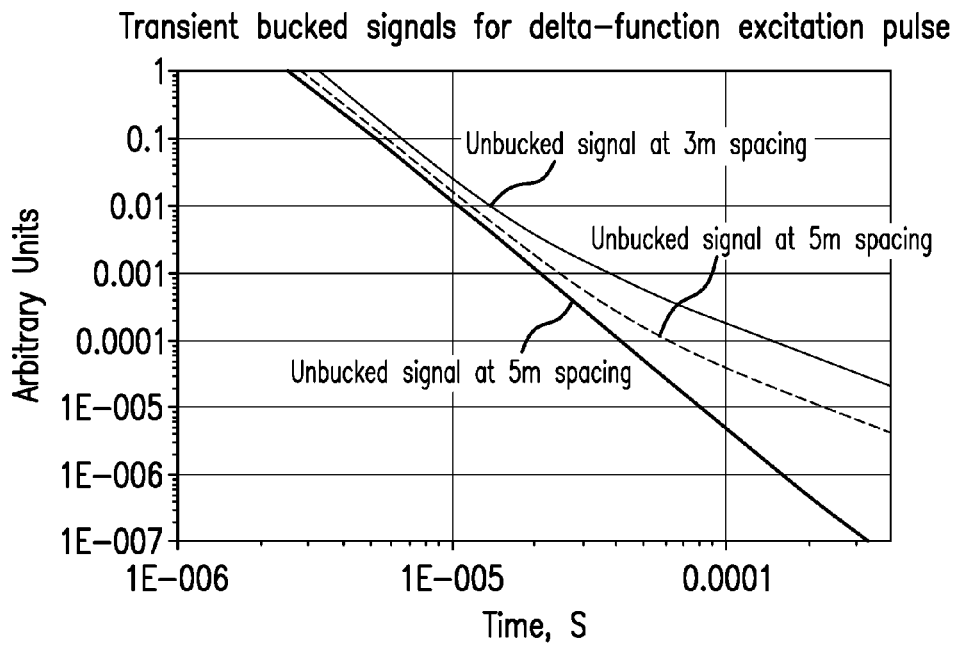
FIG. 6 shows unbucked and bucked signals generated by a simulated measurement using discrete pulse excitation according to embodiments described herein.
Figure 7:
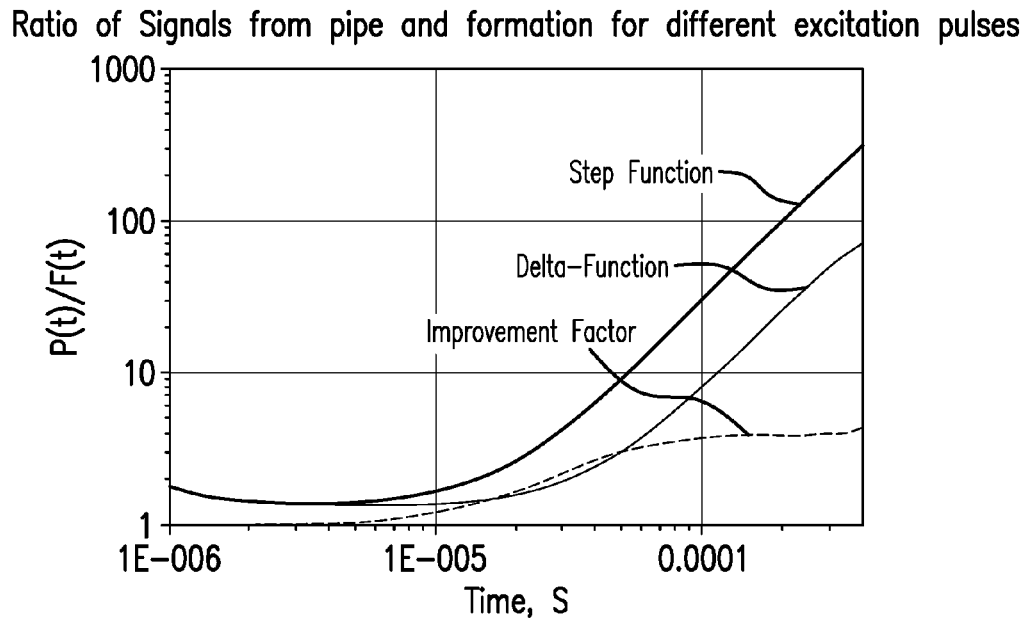
FIG. 7 shows a comparison of the relative contribution of a conductive downhole component to the signals of FIG. 5 and FIG. 6.

FIG. 6 shows unbucked signals from the receiver coils and a combined (bucked) signal measured using a delta-function based excitation pulse according to embodiments discussed above. FIG. 7 shows a first curve representing a ratio between the signals that come from the drill pipe (P(t)) and signals from the formation (F(t)) for the step function excitation of FIG. 5. FIG. 7 also shows a second curve that represents the ratio for the delta-function excitation of FIG. 6. An improvement factor, calculated by taking a ratio between the second curve and the first curve, illustrates the improvement provided by using the delta-function excitation pulse. In this example, the delta-function excitation pulse resulted in an improvement factor of about four.

In a second example, measurements were performed in a two-layered formation having a boundary placed ahead of the drill bit. The tool was placed in a resistive upper region having a resistivity of 50 ohmm. A boundary defined by the upper region and a relatively conductive lower region (1 ohmm) was located about 4 meters ahead of the drill bit. The target was selected as the boundary, so the DOI was around 4 meters.

Figure 8:
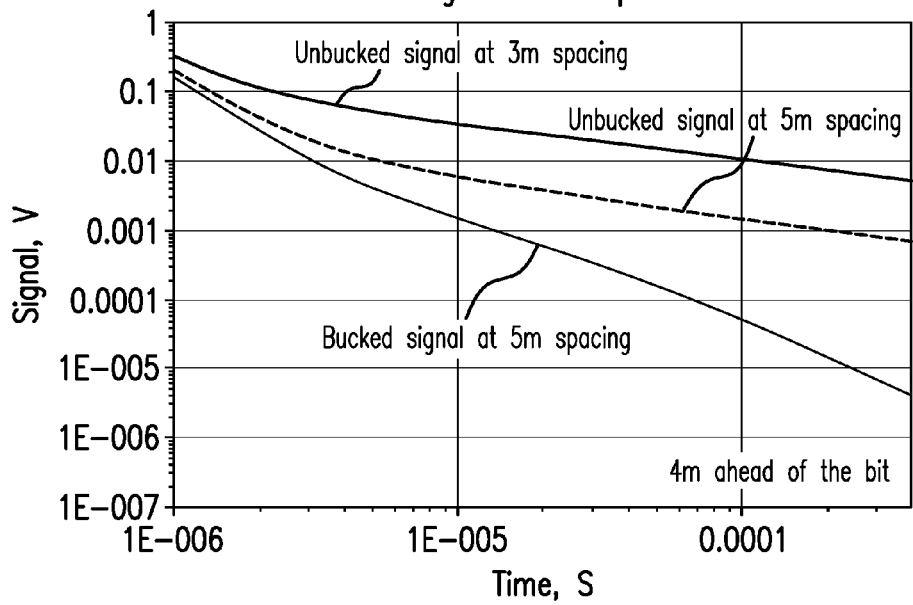
FIG. 8 shows unbucked and bucked signals generated by a simulated measurement of a dual-layer formation using step function excitation of a transmitter.
Figure 9:
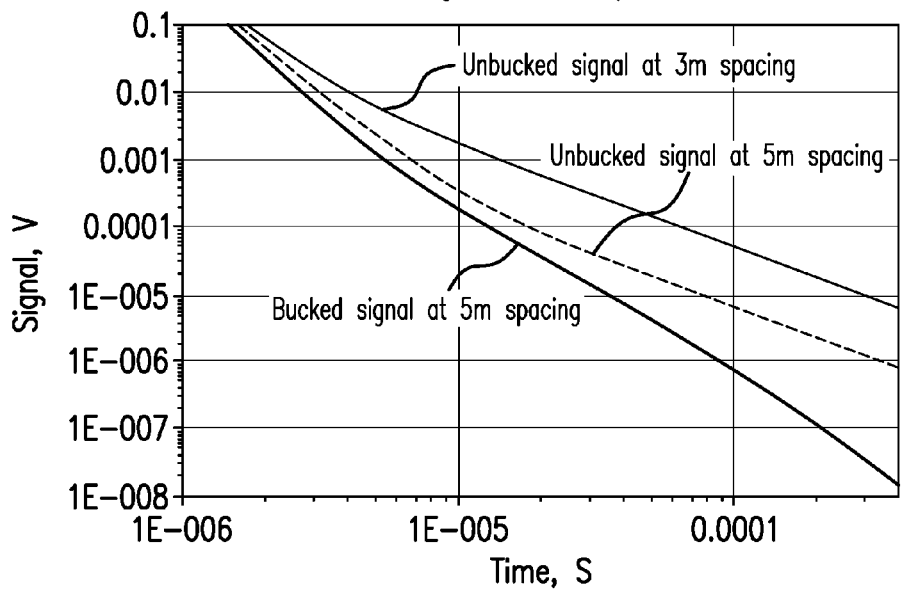
FIG. 9 shows unbucked and bucked signals generated by a simulated measurement of a dual-layer formation using discrete pulse excitation according to embodiments described herein.

FIG. 8 shows unbucked signals and a combined signal corresponding to traditional step function excitation, and FIG. 9 shows unbucked signals and a combined signal corresponding to a delta-function based excitation pulse according to embodiments discussed above.

Figure 10:
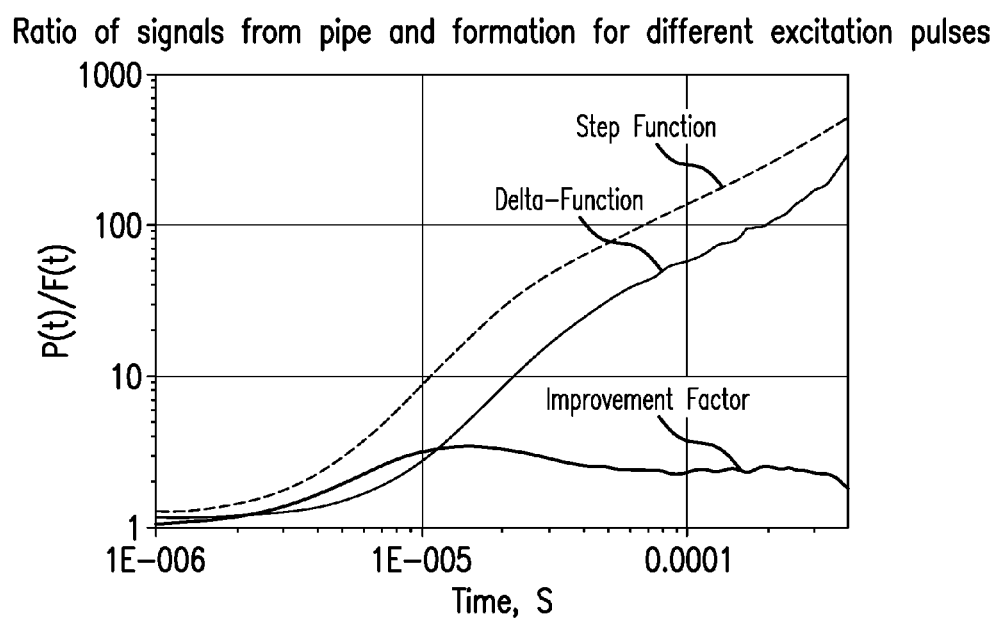
FIG. 10 shows a comparison of the relative contribution of a conductive downhole component to the signals of FIG. 8 and FIG. 9.

FIG. 10 shows a first curve representing a ratio between the signals that come from the drill pipe (P(t)) and signals from the formation (F(t)) for the step function excitation of FIG. 8, and a second curve representing the ratio for the delta-function excitation of FIG. 6. In this example, an improvement factor of about 2.5 was achieved using the delta-function excitation pulse.

Generally, some of the teachings herein are reduced to an algorithm that is stored on machine-readable media. The algorithm is implemented by a computer and provides operators with desired output.

The systems described herein may be incorporated in a computer coupled to the tool 24. Exemplary components include, without limitation, at least one processor, storage, memory, input devices, output devices and the like. As these components are known to those skilled in the art, these are not depicted in any detail herein. The computer may be disposed in at least one of a surface processing unit and a downhole component.

Set forth below are some embodiments of the foregoing disclosure:

Embodiment 1

A method of performing an electromagnetic measurement of an earth formation, the method comprising: disposing a downhole tool in a borehole in an earth formation, the downhole tool including an electrically conductive component, at least one electromagnetic transmitter located at a location along the tool, a first receiver located a first distance from the location, and a second receiver located at a second distance from the location; applying a single rectangular current pulse having a substantially constant amplitude to the transmitter to generate an electric current in the formation, the current pulse having a specified time duration $\Delta T$; measuring transient signals at each of the first and second receivers during a time period subsequent to the time in response to the generated current; and combining the transient signals to generate a combined transient signal, and estimating a resistivity of the formation based on the combined transient signal, wherein estimating is performed as a part of a downhole operation.

Embodiment 2

The method of embodiment 1, wherein estimating the parameter includes performing an inversion of the combined transient signal based on a modeled response of the receivers, the modeled response calculated based on a model of the tool that excludes the conductive component.

Embodiment 3

The method of embodiment 1, wherein the duration of the pulse is less than or equal to about 20 microseconds.

Embodiment 4

The method of embodiment 1, wherein the time period extends to a measurement time associated with a distance between the downhole tool and a desired depth of investigation.

Embodiment 5

The method of embodiment 4, wherein the time duration is selected to be multiple times shorter than the time period.

Embodiment 6

The method of embodiment 1, wherein the first receiver is a main coil, and the second receiver is a bucking coil, the second distance less than the first distance.

Embodiment 7

The method of embodiment 1, wherein the transient signals are combined using a bucking coefficient, the bucking coefficient calculated based on applying the pulse to the transmitter and receiving transient signals in a known environment prior to disposing the downhole tool in the borehole.

Embodiment 8

The method of embodiment 1, wherein the transmitter is a transmitter coil and the receivers are receiver coils, the downhole tool further including a shielding material located proximate to and centered around at least one of the transmitter coil and one or more of the receiver coils.

Embodiment 9

The method of embodiment 1, further comprising controlling a parameter of a downhole operation based on the resistivity.

Embodiment 10

A system for performing an electromagnetic measurement of an earth formation, the system comprising: a downhole tool configured to be disposed in a borehole in an earth formation, the downhole tool including an electrically conductive component, at least one electromagnetic transmitter located at a location along the tool, a first receiver located a first distance from the location, and a second receiver located at a second distance from the location; and a processing device configured to apply a single rectangular current pulse having a substantially constant amplitude to the transmitter to generate an electric current in the formation, the current pulse having a specified time duration $\Delta T$, the processing device configured to perform: measuring transient signals at each of the first and second receivers during a time period subsequent to the time in response to the generated current; and combining the transient signals to generate a combined transient signal, and estimating a resistivity of the formation based on the combined transient signal, wherein estimating is performed as a part of a downhole operation.

Embodiment 11

The system of embodiment 10, wherein estimating the parameter includes performing an inversion of the combined transient signal based on a modeled response of the receivers, the modeled response calculated based on a model of the tool that excludes the conductive component.

Embodiment 12

The system of embodiment 10, wherein the duration of the pulse is less than or equal to about 20 microseconds.

Embodiment 13

The system of embodiment 10, wherein the time period extends to a measurement time associated with a distance between the downhole tool and a desired depth of investigation.

Embodiment 14

The system of embodiment 13, wherein the time duration is selected to be multiple times shorter than the time period.

Embodiment 15

The system of embodiment 10, wherein the first receiver is a main coil, and the second receiver is a bucking coil, the second distance less than the first distance.

Embodiment 16

The system of embodiment 10, wherein the transient signals are combined using a bucking coefficient, the bucking coefficient calculated based on applying the pulse to the transmitter and receiving transient signals in a known environment prior to disposing the downhole tool in the borehole.

Embodiment 17

The system of embodiment 10, wherein the transmitter is a transmitter coil and the receivers are receiver coils, the downhole tool further including a shielding material located proximate to and centered around at least one of the transmitter coil and one or more of the receiver coils.

Embodiment 18

The system of embodiment 10, wherein the processing device is further configured to control a parameter of a downhole operation based on the resistivity.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of performing an electromagnetic measurement of an earth formation, the method comprising:
    disposing a downhole tool in a borehole in the earth formation, the downhole tool including an electrically conductive component, at least one electromagnetic transmitter located at a location along the downhole tool, a first receiver located a first distance from the location, and a second receiver located at a second distance from the location;
    applying a single rectangular first current pulse having a substantially constant amplitude to the transmitter to generate an electric current in the earth formation, the first current pulse having a specified time duration $\Delta T$, the first current pulse immediately followed by an acquisition duration during which current is not applied to the transmitter, the specified time duration $\Delta T$ configured to reduce a parasitic effect due to currents induced in the electrically conductive component;
    measuring transient signals at each of the first and second receivers during a time period subsequent to the specified time duration $\Delta T$ in response to the generated current; and
    combining the transient signals to generate a combined transient signal, and estimating a resistivity of the earth formation based on the combined transient signal, wherein estimating is performed as a part of a downhole operation.

2. The method of claim 1, wherein estimating the resistivity includes performing an inversion of the combined transient signal based on a modeled response of the first and second receivers, the modeled response calculated based on a model of the downhole tool that excludes the conductive component.

3. The method of claim 1, wherein the duration of the first current pulse is less than or equal to about 20 microseconds.

4. The method of claim 1, wherein the time period extends to a measurement time associated with a distance between the downhole tool and a desired depth of investigation.

5. The method of claim 4, wherein the time duration is selected to be multiple times shorter than the time period.

6. The method of claim 1, wherein the first receiver is a main coil, the second receiver is a bucking coil, and the second distance is less than the first distance.

7. The method of claim 1, wherein the transient signals are combined using a bucking coefficient, the bucking coefficient calculated based on applying the first current pulse to the transmitter and receiving transient signals in a known environment prior to disposing the downhole tool in the borehole.

8. The method of claim 1, wherein the transmitter is a transmitter coil and the receivers are receiver coils, the downhole tool further including a shielding material located proximate to and centered around at least one of the transmitter coil and one or more of the receiver coils.

9. The method of claim 1, further comprising controlling a parameter of a downhole operation based on the resistivity.

10. The method of claim 1, wherein the specified time duration $\Delta T$ is a shortest duration that is resolvable by the transmitter.

11. A system for performing an electromagnetic measurement of an earth formation, the system comprising:
a downhole tool configured to be disposed in a borehole in the earth formation, the downhole tool including an electrically conductive component, at least one electromagnetic transmitter located at a location along the downhole tool, a first receiver located a first distance from the location, and a second receiver located at a second distance from the location; and
a processing device configured to apply a single rectangular first current pulse having a substantially constant amplitude to the transmitter to generate an electric current in the earth formation, the first current pulse having a specified time duration $\Delta T$, the first current pulse immediately followed by an acquisition duration during which current is not applied to the transmitter, the specified time duration $\Delta T$ configured to reduce a parasitic effect due to currents induced in the electrically conductive component, the processing device configured to perform:
measuring transient signals at each of the first and second receivers during a time period subsequent to the specified time duration $\Delta T$ in response to the generated current; and
combining the transient signals to generate a combined transient signal, and estimating a resistivity of the earth formation based on the combined transient signal, wherein estimating is performed as a part of a downhole operation.

12. The system of claim 11, wherein estimating the resistivity includes performing an inversion of the combined transient signal based on a modeled response of the first and second receivers, the modeled response calculated based on a model of the downhole tool that excludes the conductive component.

13. The system of claim 11, wherein the duration of the first current pulse is less than or equal to about 20 microseconds.

14. The system of claim 11, wherein the time period extends to a measurement time associated with a distance between the downhole tool and a desired depth of investigation.

15. The system of claim 14, wherein the time duration is selected to be multiple times shorter than the time period.

16. The system of claim 11, wherein the first receiver is a main coil, the second receiver is a bucking coil, and the second distance is less than the first distance.

17. The system of claim 11, wherein the transient signals are combined using a bucking coefficient, the bucking coefficient calculated based on applying the first current pulse to the transmitter and receiving transient signals in a known environment prior to disposing the downhole tool in the borehole.

18. The system of claim 11, wherein the transmitter is a transmitter coil and the receivers are receiver coils, the downhole tool further including a shielding material located proximate to and centered around at least one of the transmitter coil and one or more of the receiver coils.

19. The system of claim 11, wherein the processing device is further configured to control a parameter of a downhole operation based on the resistivity.

20. The system of claim 11, wherein the specified time duration $\Delta T$ is a shortest duration that is resolvable by the transmitter.

* * * * *